United States Patent [19]

Gori

[11] Patent Number: 4,784,861

[45] Date of Patent: Nov. 15, 1988

[54] WEIGHT-CONTROL FORMULATION

[75] Inventor: Gio B. Gori, Bethesda, Md.

[73] Assignee: CCA Industries, Inc., East Rutherford, N.J.

[21] Appl. No.: 934,015

[22] Filed: Nov. 24, 1986

[51] Int. Cl.$^4$ .......................... A23L 1/30; A23L 1/308
[52] U.S. Cl. ...................................... 426/74; 424/439; 426/618; 426/658; 426/804
[58] Field of Search ................... 426/74, 93, 804, 618, 426/658, 72; 424/439

[56] References Cited

U.S. PATENT DOCUMENTS

| | | | |
|---|---|---|---|
| 3,917,861 | 11/1975 | Viera et al. | 426/274 |
| 3,992,555 | 11/1976 | Kovacs | 426/93 X |
| 4,565,702 | 1/1986 | Morley et al. | 426/93 |

OTHER PUBLICATIONS

"How Selenium Protects You Against Heart Disease", The Health Quarterly (Plus Two), Mar./Apr. 1981, vol. 6, No. 2, pp. 10-11, 60-61.

Primary Examiner—Donald E. Czaja
Assistant Examiner—Celine Callahan
Attorney, Agent, or Firm—Roberts, Spiecens & Cohen

[57] ABSTRACT

A packaged weight-control powder is provided as a food additive to be employed before eating. Each package includes a dose to be sprinkled on the foodstuff to be eaten. The powder is formed of a mixture of oat, wheat and corn brans mixed with pectin, guar gum psyllium and cutin. Mineral supplements are employed to replace those removed by the fibers of the brans. The powder is prepared in an atmosphere of less than 50% humidity and is packed in individual water-proof packages of relatively small size.

9 Claims, No Drawings

WEIGHT-CONTROL FORMULATION

FIELD OF INVENTION

This invention relates to preparations and formulae which are useful in connection with weight control and to methods of using and preparing the same.

BACKGROUND

James W. Anderson discusses dietary fiber in the article Physiological and Metabolic Effects of Dietary Fiber, Federation Proc. 44: 2902–2906; 1985. Therein he traces the history of the health benefits of vegetable fiber or bulk back to the recognition of the same by William Beaumont 130 years ago. Suggested therein is the fact that the high incidence of colon cancer, coronary heart disease, diabetes, obesity, hypertension and certain other diseases amongst Western people relate to their low intake of dietary fiber. It is also mentioned that clinical and physiological studies indicate that fiber affects gastrointestinal function and glucose homeostasis, as well as serum lipid levels. Plant fibers are defined in this article as the non-starch polysaccharide and lignin portions, predominantly cell wall components of plant foods that are not digested in the human small intestine. Dietary fibers are said to include fibers which may include cutins, waxes and other non-digestible cell wall and coating materials. It is furthermore noted that among the physiological effects of pectin or guar, which are highly purified, water soluble fibers, is the delay of gastric emptying. Further stated is the conclusion that the effects of commonly used high fiber foods on gastric emptying are not well-established. It is further pointed out that cellulose and hemi-cellulose include the physiological effects of increasing fecal bulk and the decreasing of intestinal transit time. It is also indicated that pectins and gums delay gastric emptying, slow glucose absorption and lower serum cholesterol. Reference is furthermore made in this article to the fact that oat bran may lower serum cholesterol in human subjects.

In the article, the Digestion of Pectin in the Human Gut and Its Effect on Calcium Absorption and Large Bowel Function, J. Nutr. (1979) 41, 477, J. H. Cummings, et al. report their study on the effect of dietary fiber digestion in the human gut on its ability to alter bowel habit and report that pectin is largely metabolized in the human gut which could explain its lack of effect on bowel habit and Ca balance.

In the Proceedings of the Society for Experimental Biology and Medicine, 180, 132–446 (1985), George V. Vahouny and Marie M. Cassidy report on dietary fibers and the absorption of nutrients. Therein it is stated that the intestinal absorption of nutrients can be influenced by modifying the rates at which food enters and leaves the stomach. It is stated that high fiber, bulkier foods may require longer periods for ingestion and thereby modify the rates of gastric filling.

None of these articles relate to the interaction between different types of fiber sources and/or brans and the like and the use of the same in conjunction with other substances which absorb water and form gelatinous bulks and viscous coatings.

SUMMARY OF INVENTION

It is an object of the invention to utilize brans in conjunction with other gut influencing substances to formulate an improved and natural weight control substance.

It is another object of the invention to accommodate the utilization of fiber sources in the human gut by providing mineral supplements to replace the minerals which are kelated or sequestered by fibers during the passage thereof through the human gut.

Another object of the invention is to provide an improved weight control product which is readily and conveniently employed such as by the addition of the same to a foodstuff immediately prior to the ingesting of the same.

Yet another object of the invention is to provide an improved method for the formulation of an improved weight control substance.

In accordance with the aspect of the invention which relates to the improved product provided in accordance therewith, there is provided an ingestible formulation which comprises a mixture of fiber-containing materials and means for absorbing water and creating a gelatinous bulk and viscous coating. The mixture and the aforesaid means constitute a dry powder substance adapted for being sprinkled on food. In accordance with the invention, the formulation may be provided in individual doses, for example 0.5–5.0 grams. The doses are individually packaged in packets which are preferably in the form of flat sealed containers of water-proof material.

In accordance with a further aspect of the invention, the fiber containing materials are brans and are sources of at least one of the group consisting of lignin, cellulose and hemi-cellulose. The mineral supplements referred to hereinabove are preferably in the form of salts of the group consisting of maganese, selenium, zinc, copper, iron and calcium and magnesium.

According to a feature of the invention, the brans are selected from the group consisting of oat, wheat and corn brans and the features of each of these brans are cooperatively employed in conjunction with the features of the others to provide an improved product.

According to a further feature of the invention, the aforesaid means are selected from the group consisting of pectin, guar gum, psyllium and cutin. The cutin may preferably be derived from apple skins.

The formulation of the invention may, for example, be employed in a daily dosage of ten packets for an average person of, for example, 150 lbs. The packets may, for example, include individual dosages of, for example, two grams each. In the dosages the brans will constitute 50–60% by weight of the formulation and the balance will be formed by the water absorbing materials and the mineral supplements.

In accordance with the aspect of the invention relating to the utilization of the product of the invention, there is provided a method which comprises imparting the dietetic characteristics to a foodstuff resulting in weight control by adding to the foodstuff a mixture of fiber-containing materials and materials adapted for absorbing water and forming a gelatinous bulk and viscous coating as aforesaid. The materials will be added by sprinkling the same in powdered form onto the foodstuff immediately prior to ingesting of the same or, in general, sometime between the processing of the foodstuff and the time at which the foodstuff is to be ingested. Thus, the formulation of the invention will be employed much in the same way as a sweetener or a salt is added to a foodstuff before the same is eaten.

As will be seen hereinbelow, the invention also relates to the method of preparing a dietetic food additive.

Generally, this method comprises mixing a plurality of different brans with at least one substance which is lubricative in the human bowels. As has been implied hereinabove, the brans and the substance or substances to be added are mixed to form a powder. The mixing is preferably effected in an atmosphere of below 50% relative humidity and the brans and other substances are those which have been mentioned hereinabove and which will be shown hereinbelow in the form of specific examples. The brans, pectin, guar gum, psyllium and cutin are substantially homogenously mixed to form a generally homogenous mixture which is sub-divided into packages of about 0.5–5.0 grams each.

The above objects, features and advantages of the invention will be supplemented by those to be found in the Detailed Description which follows hereinbelow.

DETAILED DESCRIPTION

The substance of the invention is a scientifically balanced formulation of essential natural fibers supplemented with the major minerals that the use of such fibers requires. Unlike other known products the substance of the invention is designed to provide all fiber varieties known to generate specific health effects deriving from regular fiber intake. Fibers are not to be considered equal to one another. Bran alone is not a complete dietary fiber. The substance of the invention contains all the significant dietary fiber components that should be present in a well-balanced natural diet. Fiber is in effect a catch-all expression for the variety of non-digestible organic substances present in a natural diet. Besides lignin, a major component of wood present in most foods of vegetable origin, fiber components are substances built of certain sugar units linked together by chemical bonds (e.g., non-alpha glucans) that in general make them undigestible. These substances have different properties and range from fibrous and bulky cellulose to pectins and gums that absorb water and create gelatinous bulk and viscous coatings and to lubricating mucilages and other water logging materials. All these fiber components should be present in a natural diet, and the substance of the invention is designed to restore the natural fibers that modern food technology is known to remove from the processed foods which are consumed.

Consistent with the theory of the invention, fiber should be admixed with all foodstuffs. Thus, in order to optimize diets, one should add the substance of the invention throughout the day to his or her meals. Thereby its beneficial effects will be available not in a single dose, but evenly spaced in all consumed foodstuffs. For this reason, the substance of the invention is provided in small individual packages containing, for example, 3.3 grams each; ten packets a day are, for example, recommended for an average person of 150 lbs., and proportionately less or more can be used depending on body weight. Initially, one will probably experience some change in intestinal habits. As the digestive system adapts to increased fiber and as intestinal bacteria also change accordingly, one will determine the right amount of the substance of the invention that best suits his or her personal digestive preferences.

The substance of the invention is formulated to provide all the benefits known to derive from a balanced formulation of natural fibers. Appetite will be reduced and the time the food remains in the digestive system and one's capacity to utilize the ingested calories are also reduced. As a result, one will be able to control weight, not by artificial and possibly harmful dieting, but through the natural means nature intended, while enjoying all the rewards of a pleasing diet. Besides weight control, the substance of the invention with its balance of fibers will also help achieve other well-known benefits of dietary fiber. Among them are included minimizing the possibility of cancer and preventing certain digestive diseases, reducing blood cholesterol and triglicerides to prevent heart diseases, and other benefits that are scientifically known. Of course, it is essential to adopt a proper diet, to reduce fats, sugars and calories in general, and it is helpful to increase one's consumption of fruits, vegetables and nuts.

100 grams of a preferred fiber formulation will preferably be prepared according to the following listing. All ingredients in the following listing are to be finely ground.

| FIBER FORMULA | |
|---|---|
| Substance | Amount |
| Oat Bran | 30 grams ± 15% |
| Wheat Bran | 15 grams ± 15% |
| Corn Bran | 10 grams ± 15% |
| Pectin (Technical Grade) | 10 grams ± 15% |
| Guar Gum | 20 grams ± 15% |
| Psyllium (Seed) | 10 grams ± 15% |
| Cutins (Apple Skins) | 5 grams ± 15% |
| Manganese | 10.0 mgs. per 100 grams |
| Selenium | 0.1 mg. per 100 grams |
| Zinc | 20.0 mg. per 100 grams |
| Copper | 5.0 mg. per 100 grams |
| Iron | 20.0 mg. per 100 grams |
| Calcium | 200.0 mg. per 100 grams |
| Magnesium | 150.0 mg. per 100 grams |

In the aforesaid, the selenium is preferably supplied in the form of enriched yeast selenium in an amount to yield the desired amount of psyllium.

The aforegoing general formulation has been derived to control the lubricating effects in the human gut or bowel while avoiding too extensive a laxative effect. The oat bran is employed as a natural product which is rich in natural gums of different viscosities. The oat bran, however, does not supply sufficient lignin or pectin to be employed by itself in the formulation. The wheat bran is employed as being rich in lignin. The corn bran is employed because it is rich in hemi-cellulose. In the above formulation, cutins may, under limited circumstances, be eliminated and, in such event, the psyllium would be increased in amount to replace the cutins. Preferably, however, the use of cutins is considered essential to obtaining the best results of the invention.

In formulating the above, the ingredients are homogenously mixed with standard blending apparatus while the humidity is preferably kept below 50% relative humidity. The substance is prepared in the form of a dry homogenous powder which is packed in small packets. These packets are preferably of a water-proof paper or the like which may be torn for purposes of opening and to enable a sprinkling of the powder onto the foodstuff which is to be ingested, immediately before ingesting of the same. Preferably, the timing of the addition of the formulation of the invention is that it follows the processing of the foodstuff to be eaten and precedes the ingesting of the same. A recommended dosage is about 10 grams per day. 10 packets a day, for example, is recommended for an average person of about 150 lbs. The packets of the invention which may be flat rectangular packets of a dimension somewhat less than 2" by 2" may include, for example, 0.5–5.0 grams of the formulation of the invention per packet.

The formulations of the invention will include approximately 50–60% of the brans of which all of the brans are preferably employed, but the corn bran may be excluded under certain circumstances. Specific examples of formulations to be employed next follow hereinbelow:

EXAMPLE I

| | |
|---|---|
| Oat Bran | 30 grams |
| Wheat Bran | 15 grams |
| Corn Bran | 10 grams |
| Pectin | 10 grams |
| Guar Gum | 20 grams |
| Psyllium | 10 grams |
| Cutins | 5 grams |
| Manganese | 10.0 mg. |
| Selenium | .1 mg. |
| Zinc | 20.0 mg. |
| Copper | 5.0 mg. |
| Iron | 20.0 mg. |
| Calcium | 200.0 mg. |
| Magnesium | 150.0 mg. |

EXAMPLE II

| | |
|---|---|
| Oat Bran | 35 grams |
| Wheat Brain | 15 grams |
| Pectin | 10 grams |
| Guar Gum | 20 grams |
| Psyllium | 10 grams |
| Cutins | 5 grams |
| Manganese | 8 mg. |
| Selenium | .5 mg. |
| Zinc | 15 mg. |
| Copper | 2.5 mg. |
| Iron | 25 mg. |
| Calcium | 145 mg. |
| Magnesium | 150.0 mg. |

EXAMPLE III

| | |
|---|---|
| Oat Bran | 30 grams |
| Wheat Bran | 10 grams |
| Corn Bran | 20 grams |
| Pectin | 5 grams |
| Guar Gum | 23 grams |
| Psyllium | 15 grams |
| Manganese | 12 mg. |
| Selenium | .2 mg |
| Zinc | 32 mg. |
| Copper | 6 mg. |
| Iron | 5 mg. |
| Calcium | 100 mg. |
| Magnesium | 150.0 mg. |

EXAMPLE IV

| | |
|---|---|
| Oat Bran | 30 grams |
| Wheat Bran | 10 grams |
| Corn Bran | 20 grams |
| Pectin | 20 grams |
| Guar Gum | 10 grams |
| Psyllium | 7.5 grams |
| Cutins | 7.5 grams |
| Manganese | 20 mg. |
| Selenium | .7 mg. |
| Zinc | .7 mg. |
| Copper | 7.5 mg. |
| Iron | 25 mg. |
| Calcium | 190 mg. |
| Magnesium | 150.0 mg. |

EXAMPLE V

| | |
|---|---|
| Oat Bran | 30 grams |
| Wheat Bran | 30 grams |
| Pectin | 10 grams |
| Guar Gum | 15 grams |
| Cutins | 15 grams |
| Manganese | 5 mg. |
| Selenium | .05 mg. |
| Zinc | 5 mg. |
| Copper | 1 mg. |
| Iron | 3 mg. |
| Calcium | 155 mg. |
| Magnesium | 138 mg. |

As to the mineral content mentioned above (which preferably constitutes less than one percent of the formulations), typical salt quantities are as follows:

Manganese requires 82.47 mg. of manganese sulfate ($MnSO_4$)/100 grams.

Zinc requires 139.37 mg. of zinc gluconate/100 grams.

Copper requires 35.71 mg. of copper gluconate/100 grams.

Iron requires 54.39 mg. of ferrous sulfate ($FeSO_4$)/100 grams.

Calcium requires 516.0 mg. of calcium phosphate tribasic ($Ca_3(PO_4)_2$).

Magnesium requires 249.0 mg. of magnesium oxide ($MgO$)/100 grams.

Selenium requires 1 gram of selenium yeast containing 100 micrograms per gram of yeast/100 grams.

It should be noted that mineral supplements are removed from foodstuffs by being entrapped in the fiber containing materials. These removed supplements are replaced by being added to the compounds of the invention.

The brans and other substances used herein are commercially available. The brans are available from, for example, Freeman Industries, Inc. of Tuckahoe, N.Y. Some example specifications are as follows:

ROASTED OAT FIBER/BRAN

Oat Fiber/Bran is a natural high fiber, light colored ingredient. This product is fully cooked and stabilized.

| PRODUCT CHARACTERISTICS | |
|---|---|
| Color | off white (tan) |
| Odor | nil |
| Flavor | bland |
| TYPICAL PROXIMATE ANALYSIS | |
| Fiber | |
| crude | 30.0% |
| dietary | 70%–90% |
| soluble | 40%–50% |
| Protein (N × 6.25) | 6.0% |
| Fat | 0.7% |
| Carbohydrates | 54.3% |
| Ash | 4.0% |
| Moisture | 5.0% |
| Calories per 100 grams | 30 |
| TYPICAL MICROBIOLOGICAL PROFILE | |
| TPC | 25,000/gram maximum |
| E. Coli | negative |

-continued

| | |
|---|---|
| Yeasts and Molds | 100/gram maximum |
| Salmonella | negative |
| Staphylococcus | negative |

ROASTED WHEAT FIBER/BRAN

Roasted Wheat Fiber/Bran is a fully roasted product which gives it great stability and adds to its' crispness and mouth feel.

| PRODUCT CHARACTERISTICS | |
|---|---|
| Color | tan and red (soft or hard wheat) |
| Odor | typical fresh bran |
| Flavor | bland |
| TYPICAL PROXIMATE ANALYSIS | |
| Fiber | |
| crude | 10.0% |
| dietary | 45.0% |
| soluble | 35.0% |
| Protein (N × 6.25) | 14.0% |
| Fat | 5.0% |
| Carbohydrates | 56.0% |
| Ash | 6.0% |
| Moisture | 9.0% |
| Calories per 100 grams | 185 |
| TYPICAL MICROBIOLOGICAL PROFILE | |
| TPC | 25,000/gram maximum |
| E. Coli | negative |
| Yeasts and Molds | 100/gram maximum |
| Salmonella | negative |
| Staphylococcus | negative |

ROASTED CORN FIBER/BRAN

Made from cereal grade corn, this product is a golden color, is fully roasted and ground, and contains TWICE AS MUCH DIETARY FIBRE as Wheat Fiber/Bran.

| PRODUCT CHARACTERISTICS | |
|---|---|
| Color | golden |
| Odor | bland |
| Flavor | bland (corny) |
| TYPICAL PROXIMATE ANALYSIS | |
| Fiber | |
| crude | 23.0% |
| dietary | 80.0%–90.0% |
| soluble | 57.0%–67.0% |
| Protein (N × 6.25) | 7.0% |
| Fat | 2.0% |
| Carbohydrates | 59.0% |
| Ash | 1.0% |
| Moisture | 8.0% |
| Calories per 100 grams | 60 |
| TYPICAL MICROBIOLOGICAL PROFILE | |
| TPC | 25,000/gram maximum |
| E. Coli | negative |
| Yeasts and Molds | 100/gram maximum |
| Salmonella | negative |
| Staphylococcus | negative |

PECTIN

Mol. wt equals 20,000–400,000. Polysaccharide substance present in cell walls of all plant tissues which functions as an intercellular cementing material. One of the richest sources of pectin is lemon or orange rind which contains about 30% of this polysaccharide. Occurs naturally as the partial methyl ester of a-(1→4) linked D-polygalacturonate sequences interrupted with (1→2)-L-rhamnose residues. Neutral sugars: D-galactose, L-arabinose, D-xylose and L-fucose form side chains on the pectin molecule.

UNIGUAR 80 (available from Celanese Water Soluble Polymers of Clifton, N.J.).

DESCRIPTION

Guar gum is obtained from the ground endosperm of *Cyamopsis tetragonolobus*. It is composed primarily of high molecular weight hydrocolloidal polysaccharides, galactose and mannose units combined through glycosidic linkages and may be described chemically as a galactomannan. Uniguar is a cream to light tan powder. It is dispersible in hot or cold water forming high viscosity solutions. A variety of Uniguar grades are available offering high viscosity but differing in mesh size to accommodate various applications.

MESH ANALYSIS

| Uniguar - 80 |
|---|
| 99% Min. - Through US80 |
| 40% Max. - Through US200 |

VISCOSITY

1% solution, Brookfield RVF, 20 RPM, spindle #3 at 25° C. 2 Hours—3000±500 cps., minimum.

pH—1% solution—5.0 to 6.5

ACID INSOLUBLE MATTER—Not more than 7%

ASH (TOTAL)—Not more than 15%

PROTEIN—Not more than 10%

GALACTOMANNANS—Not less than 66%

LOSS ON DRYING—Cenco moisture Balance—15% Maximum

BACTERIOLOGICAL

Salmonella—Negative by Test

E. Coli—Negative by Test

APPLE FIBER/BRAN (CUTIN)

Apple Fiber/Bran is processed from seeds and skins from the juice industry. It is a natural high fiber product and high in pectin.

| PRODUCT CHARACTERISTICS | |
|---|---|
| Color | tan |
| Odor | nil |
| Flavor | bland (slight apple) |
| TYPICAL PROXIMATE ANALYSIS | |
| Fiber | |
| crude | 38.0% |
| dietary | 55.0%–65.0% |
| soluble | 17.0% |
| Protein (N × 6.25) | 5.0% |
| Fat | 4.5% |
| Carbohydrates | 23.5% |
| Ash | 18.0% |
| Moisture | 11.0% |
| Calories per 100 grams | 90 |
| TYPICAL MICROBIOLOGICAL PROFILE | |
| TPC | 25,000/gram maximum |
| E. Coli | negative |
| Yeasts and Molds | 100/gram maximum |
| Salmonella | negative |
| Staphylococcus | negative |

The mesh size for the bran ingredients unless othewise specified above is preferably 20-80 mesh US. Rice bran may at time be substituted in the above or added. Generally, fiber content of the formulation is as expressed in the following table:

| | Fiber content (%) of ingredient | Quantity (g.) used in formulation | Fiber content (g.) in formulation |
|---|---|---|---|
| Oat Bran | 30% | 25 | 7.5 |
| Wheat Bran | 10% | 15 | 1.5 |
| Corn Bran | 23% | 10 | 2.3 |
| Pectin | 30% | 10 | 3.0 |
| Guar Gum | 66% | 20 | 13.2 |
| Psyllium | 40% | 10 | 4.0 |
| Cutins (apple Fiber) | 38% | 5 | 1.9 |

Known physiological effects of fibers include the following (see A Citizen's Petition: The Relationship Between Diet and Health, Kellogg Company, Battle Creek, Mich.):

PHYSIOLOGICAL ACTIONS OF FIBER

| Fiber Class | Functions in Man |
|---|---|
| Pectins, gums, and mucilages | Slow gastric emptying may bind bile acids<br>May affect trade mineral excretion |
| Hemicellulose | Holds water; increases stool bulk<br>May bind bile acids<br>Reduces elevated colonic intraluminal pressure<br>Reduces transit time |
| Cellulose | Holds water<br>May reduce colonic intraluminal pressure<br>May affect trace mineral excretion<br>Reduces transit time |
| Lignin | Possible antioxidant<br>Holds water<br>May bind trace minerals<br>Affects fecal steroids |

Although the invention has been described in relation to specific embodiments of the invention, it will become apparent to those skilled in the art that numerous modifications and variations can be made within the spirit and scope of the invention as defined by the attached claims:

What is claimed is:

1. An ingestible formulation consisting essentially of a mixture of fiber containing materials and means for absorbing water and creating a gelatinous bulk and viscous coating, the fiber containing materials being brans including at least oat and wheat brans and being selected from the group consisting of lignin, cellulose and hemi-cellulose, said means being selected from the group consisting of pectin, guar gum, psyllium and cutin, said formulation further comprising mineral supplements, which are salts selected from the group consisting of manganese, selenium, zinc, copper, iron and calcium, the brans, means and mineral supplements being intermingled in the form of a dry generally homogenous powdered substance adapted for being sprinkled on food, minerals corresponding to the added mineral supplements being removed from the foodstuff by being entrapped by the fiber containing materials in the human gut and the mineral supplements being in an amount which is greater than what is entrapped.

2. A formulation as claimed in claim 1 comprising 0.5–5.0 grams of said materials, means and supplements and a packet containing the same.

3. A formulation as claimed in claim 2 wherein the packet is a flat-sealed container of water-proof material.

4. A formulation as claimed in claim 1 wherein said materials and means are natural materials.

5. A formulation as claimed in claim 1 additionally comprising corn brans.

6. A formulation as claimed in claim 5 wherein the brans, means and mineral supplements are arranged in doses of from 0.5–2.0 grams per twenty pounds of body weight.

7. A formulation as claimed in claim 5 wherein the brans constitute about 50–60% by weight of the formulation.

8. A formulation as claimed in claim 7 wherein the minerals constitute less than 1% of the formulation.

9. A formulation as claimed in claim 2 comprising:

| | |
|---|---|
| oat brans | 25 grams ± 15% |
| wheat bran | 15 grams ± 15% |
| corn bran | 15 grams ± 15% |
| pectin | 10 grass ± 15% |
| guar gum | 20 grams ± 15% |
| psyllium | 10 grams ± 15% |
| cutins | 5 grams ± 15% |
| manganese | 10.0 mg. ± 10% |
| selenium | 0.1 mg. ± 10% |
| zinc | 20.0 mg. ± 10% |
| copper | 5.0 mg. ± 10% |
| iron | 20.0 mg. ± 10% |
| calcium | 200.0 mg. ± 10% |
| magnesium | 150.0 mg. ± 10% |

* * * * *